(12) United States Patent
Heyman-Dewitte et al.

(10) Patent No.: US 11,468,256 B2
(45) Date of Patent: Oct. 11, 2022

(54) OBFUSCATION OF AREAS OF A PHYSICAL ENVIRONMENT DEPICTED IN A VIDEO

(71) Applicant: Accenture Global Solutions Limited, Dublin (IE)

(72) Inventors: Nils Heyman-Dewitte, Dublin (IE); Pauric McConnell, Meath (IE); Bendert Katier, Amsterdam (NL)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/103,527

(22) Filed: Nov. 24, 2020

(65) Prior Publication Data

US 2022/0164560 A1    May 26, 2022

(51) Int. Cl.
*G06K 5/04* (2006.01)
*G06K 7/14* (2006.01)
*G06V 20/20* (2022.01)
*G06V 20/40* (2022.01)

(52) U.S. Cl.
CPC ......... *G06K 7/1443* (2013.01); *G06K 7/1452* (2013.01); *G06V 20/20* (2022.01); *G06V 20/46* (2022.01)

(58) Field of Classification Search
CPC .... G06K 7/1443; G06K 7/1452; G06V 20/20; G06V 20/46
USPC .................................................. 235/462.08
See application file for complete search history.

(56) References Cited

U.S. PATENT DOCUMENTS

| 9,769,612 | B1 * | 9/2017 | Owen | H04W 4/023 |
| 10,623,680 | B1 | 4/2020 | Rangasamy et al. | |
| 2017/0300757 | A1 | 10/2017 | Wolf | |
| 2018/0033151 | A1 | 2/2018 | Matsumoto et al. | |
| 2019/0188868 | A1 * | 6/2019 | Bagnall | G06T 7/277 |
| 2020/0089822 | A1 * | 3/2020 | Jengo | G06K 9/6253 |
| 2020/0092343 | A1 * | 3/2020 | Rakshit | H04L 65/4084 |
| 2020/0118594 | A1 * | 4/2020 | Oxholm | H04N 5/265 |
| 2021/0014575 | A1 * | 1/2021 | Selfors | H04N 21/4856 |

FOREIGN PATENT DOCUMENTS

WO     2020214897 A1    10/2020

OTHER PUBLICATIONS

Extended European Search Report for Application No. EP21209629, dated Apr. 26, 2022, 7 pages.

* cited by examiner

*Primary Examiner* — Ahshik Kim
(74) *Attorney, Agent, or Firm* — Harrity & Harrity, LLP

(57) ABSTRACT

In some implementations, a device may receive, from a camera of a source device, video data depicting a physical environment. The device may detect a target indicator associated with a target zone of the physical environment. The device may determine, based on the target indicator, a zone configuration of the target zone relative to the target indicator. The device may generate, based on a position of the source device, an initial masking content that is associated with a boundary of the target zone that is defined by the zone configuration using a spatial mapping model based on the video data and the target indicator. The device may generate a final masking content using chroma keying based on the initial masking content. The device may generate display data associated with the final masking content and the video data. The device may provide the display data to a destination device.

21 Claims, 5 Drawing Sheets

OBFUSCATION OF AREAS OF A PHYSICAL ENVIRONMENT DEPICTED IN A VIDEO

BACKGROUND

Streaming media (e.g., video streaming) involves delivering content and continually presenting the content to an end-user. A media stream can include a live stream, a look-up stream, and/or another type of stream. In a live stream, content is provided to a destination device without saving the content (e.g., using memory resources). In a look-up stream, content can be saved and/or buffered (e.g., temporarily stored) in a look-up storage prior to being provided to a destination device.

SUMMARY

In some implementations, a method includes receiving, by a device and from a camera of a source device, video data depicting a physical environment; detecting, by the device, a target indicator associated with a target zone of the physical environment; determining, by the device and based on the target indicator, a zone configuration of the target zone relative to the target indicator; generating, by the device and based on a position of the source device, an initial masking content that is associated with a boundary of the target zone that is defined by the zone configuration using a spatial mapping model based on the video data and the target indicator; generating, by the device, a final masking content using chroma keying based on the initial masking content; generating, by the device, display data associated with the final masking content and the video data; and providing, by the device, the display data to a destination device, wherein the display data causes a rendering of the physical environment on a display of the destination device to include a masking associated with the boundary of the target zone.

In some implementations, a device includes one or more memories; and one or more processors, communicatively coupled to the one or more memories, configured to: receive, from a source device, a video data depicting a physical environment; process, using an image processing model, the video data to detect a target indicator depicted within the physical environment; determine, based on the target indicator, a zone configuration of a target zone; determine, based on a position of the source device relative to the target zone, masking content that is associated with a boundary of the target zone that is defined by the zone configuration; combine the masking content and the video data to generate display data; and provide the display data to a destination device to cause a rendering of the physical environment on a display of the destination device to obfuscate a portion of the physical environment.

In some implementations, a non-transitory computer-readable medium storing a set of instructions includes one or more instructions that, when executed by one or more processors of a device, cause the device to: monitor at least one stream of video data from a source device, wherein the video data depicts a physical environment; determine, based on the at least one stream of video data, a zone configuration of a target zone of the physical environment; generate, based on a position of the source device and the zone configuration, masking content to depict a boundary of the target zone; generate, based on the masking content and the video data, display data that is configured to obfuscate a portion of the physical environment according to the boundary of the target zone being depicted by the masking content; and provide the display data to a destination device to cause a rendering of the physical environment, according to the display data, to include a masking associated with the physical environment.

DETAILED DESCRIPTION

The following detailed description of example implementations refers to the accompanying drawings. The same reference numbers in different drawings may identify the same or similar elements.

Content may be streamed from a source device to a destination device. For example, the source device may cause live video data, of an environment associated with the source device (e.g., a room in which the source device is located) to be streamed to the destination device. In some instances, the live video data may include materials and/or objects (e.g., located in the environment) that are not intended to be displayed publicly. For example, the materials and/or objects may include confidential and/or proprietary materials and/or objects that may be visible within the live video data. The live video data may enable unauthorized access to the confidential and/or proprietary materials and/or objects to a user associated with the destination device and/or to a user that uses a device to intercept the live video data. Unauthorized access to the confidential and/or proprietary materials and/or objects creates data security concerns and causes an invasion of privacy.

In various implementations, a source device with spatial location technology (e.g., AR/VR device and/or a smartphone outfitted with such capabilities) may identify, within video data, a target indicator (e.g., a QR code or other type of unique or preconfigured object). The target indicator may indicate a location of a target zone of a physical environment that may be rendered on a display. For example, a visual aid or object may be configured to be positioned within the target zone to permit all or a portion of the target zone to be rendered (e.g., depending on the location of the user). Based on the detection of the target indicator and a determined spatial position of the source device relative to the target indicator, display data may be provided to a destination device that causes a rendering of the physical environment on a display of the destination device to include a masking associated with the target zone.

In this way, security of a physical environment may be maintained to prevent fraud (thereby conserving resources associated with addressing fraudulent activity that might otherwise occur), prevent the need for a user to go to a dedicated space to show a particular object (e.g., the object may be on a manufacturing line or in an area that is inherently surrounded by confidential information and the confidential materials or objects cannot easily be moved), and/or maintain privacy associated with a portion of a physical environment, among other examples. Further, masking or obfuscating content of the video data can reduce an amount of data that is to be processed to depict a physical environment that otherwise may be irrelevant to the video stream.

Figure 1A:
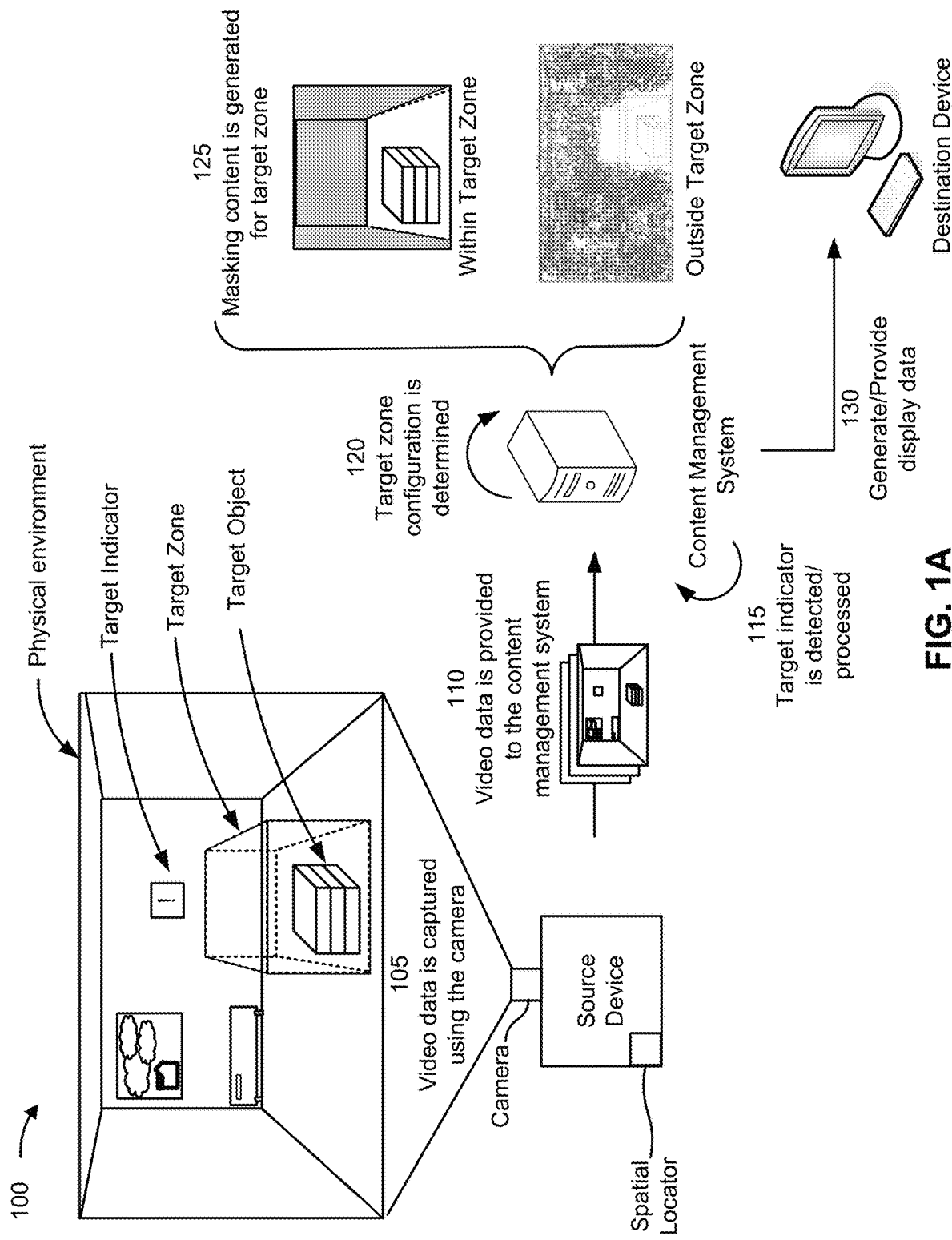
FIGS. 1A and 1B are diagrams of example implementations described herein.
Figure 1B:
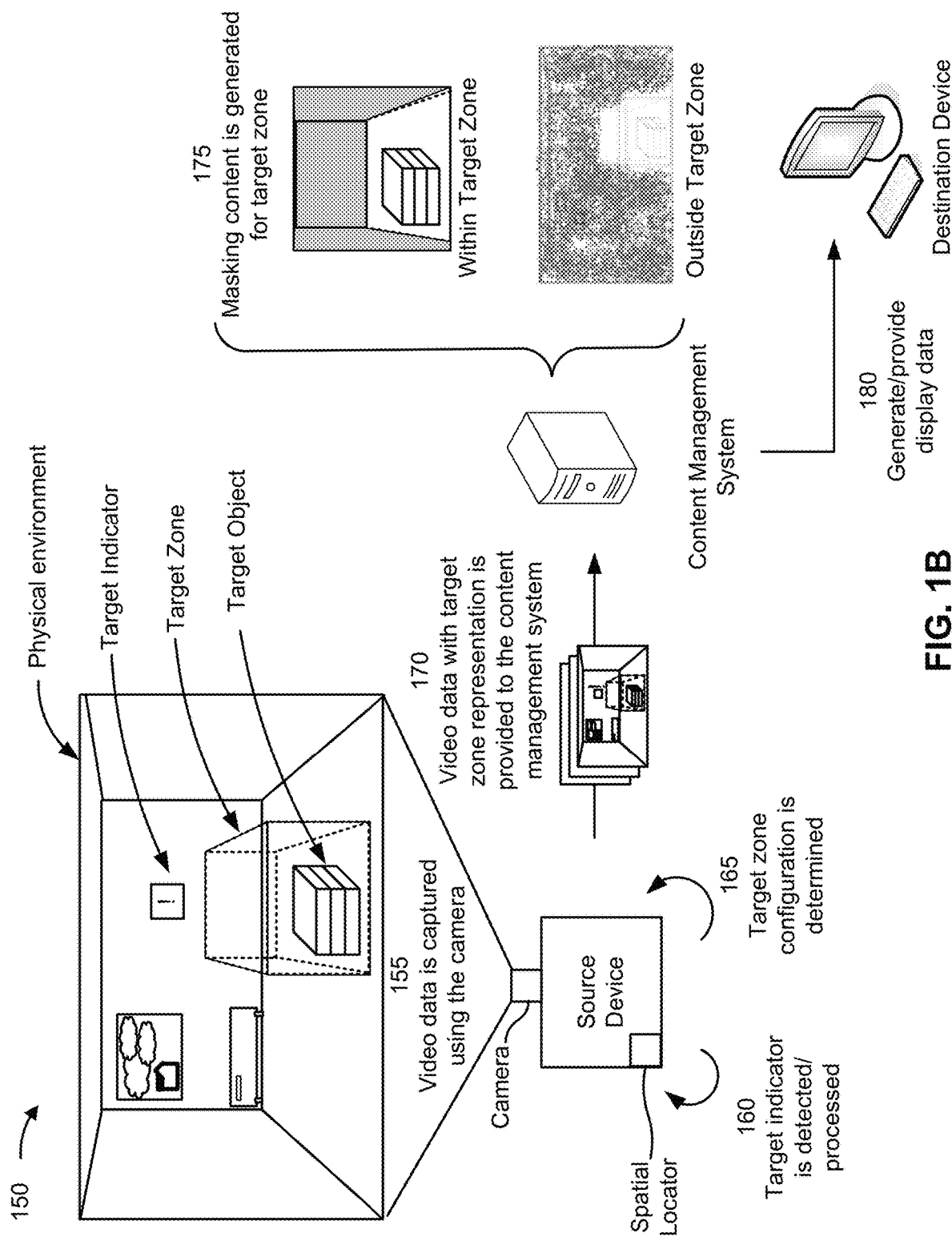

FIGS. 1A and 1B are diagrams of an example implementation 100 and 150, respectively, associated with obfuscation of areas of a physical environment depicted in a video. As shown, example implementations 100 and 150 include a source device having a camera, a content management system, and a destination device. In some implementations, the content management system may be implemented using one or more server devices that are remote from (e.g., physically separate from) the source device. In some implementations, the content management system may be implemented on the source device and/or one or more server devices. These devices are described in more detail below in connection with FIG. 2 and FIG. 3.

As shown in FIG. 1A by reference number 105, video data may be captured using the camera. The video data may include a captured scene that depicts a physical environment. The physical environment may include any type of physical environment such as, for example, a room (e.g., a product testing room, an office, a manufacturing floor), a hallway, an outdoor region, and/or a region within a vehicle, among other examples. As shown by reference number 110, the captured video data may be provided to the content management system. The video data may be associated with a video stream that is being streamed from the source device to the destination device. Streaming media (e.g., video streaming) involves delivering content and continually presenting the content to an end-user. A media stream can include a live stream, a look-up stream, and/or the like. In a live stream, content is provided to a destination device without saving the content (e.g., using memory resources). In a look-up stream, content can be saved and/or buffered (e.g., temporarily stored) in a look-up storage prior to being provided to a destination device.

As shown by reference number 115, the content management system may detect a target indicator associated with a target zone of the physical environment. A target zone may include an area or volume in the physical environment that surrounds a target object. For example, the target zone may include a volume defined by a shape that is configured to correspond to the target object. In some implementations, for example, one or more target zones may correspond to one or more target objects. In some implementations, the target indicator may include a barcode or other object placed in the physical environment and that includes a code that may be read by a computer. For example, the target indicator may include a quick response (QR) code and/or a parallel line code, among other examples.

In some implementations, the target indicator may include a type of object that is detectable within the physical environment by an image processing model that is configured to analyze the video data to detect that type of object. For example, the type of object may include confidential objects (objects that are not to be displayed as part of the streamed video), the target object, and/or other unique, identifiable objects. In some implementations, prior to detecting the target indicator, the content management system may process the video data according to an image processing model that may be configured to detect one or more target indicators. Each target indicator may be associated with a respective target zone of the physical environment.

As shown by reference number 120, the content management system may determine a target zone configuration. A target zone configuration may include any number of different characteristics of a target zone. The characteristics may include, for example, a position of the target zone relative to the target indicator. The position may include, for example, a center position of the target zone, one or more coordinates of the target zone, a position of an edge or corner of the target zone, and/or a position of a side of the target zone, among other examples. The characteristics may additionally or alternatively include at least one of dimensions of the target zone relative to the target indicator; dimensions of the target zone relative to the position of the target zone; a shape of the target zone relative to the target indicator; or a shape of the target zone relative to the position of the target zone, among other examples.

In some implementations, the content management system may determine the zone configuration of the target zone based at least in part on decoding a barcode target identifier to obtain the zone configuration of the target zone. For example, configurations of target zones may be maintained in a database and may be accessed based at least in part on the detected target indicator. The database may include an index that maps the target indicator to the target zone. In some implementations, the target indicator identifies the zone configuration of the target zone based on spatial coordinates of the boundary of the target zone.

As shown by reference number 125, the content management system may generate an initial masking content for the target zone. In some aspects, for example, the content management system may be configured to generate, based on a position of the source device (e.g., as indicated based at least in part on output from a spatial locator of the source device), an initial masking content that is associated with a boundary of the target zone that is defined by the zone configuration. For example, in some implementations, prior to generating the initial masking content, the content management system may determine, based on the spatial locator of the source device, whether the position of the source device is within the target zone. The content management system may generate the initial masking content using a spatial mapping model based on the video data and the target indicator. The content management system may generate a final masking content using chroma keying based on the initial masking content.

In some aspects, the source device may transmit positioning messages that indicate positioning information associated with the source device. Positioning information is information that the content management system may use to determine a position of the source device. The positioning messages may be sent, for example, via hyper text transport protocol (HTTP) to a server device that implements the content management system. In other aspects, positioning information may be sent along with the video data (e.g., embedded in the video data), via a control channel associated with the video data and/or through a dedicated positioning communication link, among other examples.

According to implementations, the content management system may generate initial and/or final masking content in different ways based at least in part on the position of the source device. In some implementations, a level of transparency of the final masking content is determined based on whether the position of the source device is within the target zone or outside of the target zone. For example, the content management system may determine that the position of the source device is within the target zone and may generate the final masking content as opaque content based at least in part on determining that the position of the source device is within the target zone. In this way, the video data may render a representation of a captured scene within the target zone, while a portion of the physical environment that is outside of the target zone is rendered as opaque to obfuscate that portion of the physical environment. The content management system may determine that the position of the source device is outside of the target zone and may generate the final masking content to be translucent based at least in part on determining that the position of the source device is outside of the target zone. In this way, the masking partially depicts a portion of the physical environment that is within the target zone while obfuscating the video data that depicts a portion of the physical environment that is outside of the target zone.

In some implementations, prior to generating the final masking content, the content management system may determine the position of the source device relative to the target zone; and select, based on the position of the source device, a color of the final masking content. The final masking content may be generated based on the color. For example, the final masking content may be generated using chroma keying so that other content may be conveniently superimposed thereon. In some implementations, the initial masking content may include a translucent virtual container, and the final masking content may include an opaque virtual container.

As shown by reference number 130, the content management system may generate and/or provide display data to the destination device. The display data may include the video data with the final masking content. In some implementations, the display data may include a video stream within which is integrated the final masking content. In some implementations, the display data may include a video stream and the final masking content separately, and the destination device may be configured to superimpose the final masking content on the rendered video data.

FIG. 1B illustrates another example implementation 150. In example implementation 150, similar operations to those described with respect to FIG. 1A may be performed. For example, as shown by reference number 155, video data may be captured by the camera. As shown by reference number 160, the source device may detect the target indicator. As shown by reference number 165, the source device may determine the target zone configuration (e.g., based at least in part on the target indicator). The source device may insert data associated with a representation of the target zone into the video data so that the representation of the target zone may be displayed as surrounding the target object. The representation of the target zone may include, for example, a three-dimensional shape configured to be rendered in a single color (e.g., a green rectangular prism) or multiple colors (e.g., a rectangular prism having two different colors in a checkered pattern).

As shown by reference number 170, the source device may provide the video data with the target zone representation to the content management system. In some implementations, the source device may provide two streams of video data. A first stream may include a "raw" video stream and a second data stream (e.g., a data stream that includes the target zone representation). In this way, the content management system may generate mask content for the target zone based at least in part on the target zone representation included in the second data stream. As show by reference number 175, for example, the content management system generates the masking content for the target zone. As shown by reference number 180, the content management system may generate and/or provide display data to the destination device.

In implementations described above, using content masking for security of a physical environment may be maintained to prevent fraud (thereby conserving resources associated with addressing fraudulent activity that might otherwise occur), prevent the need for a user to go to a dedicated space to show a particular object (e.g., the object may be on a manufacturing line or in an area that is inherently surrounded by confidential information and the confidential materials or objects cannot easily be moved), and/or maintain privacy associated with a portion of a physical environment, among other examples. Further, masking or obfuscating content of the video data can reduce an amount of data that is to be processed to depict a physical environment that otherwise may be irrelevant to the video stream.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
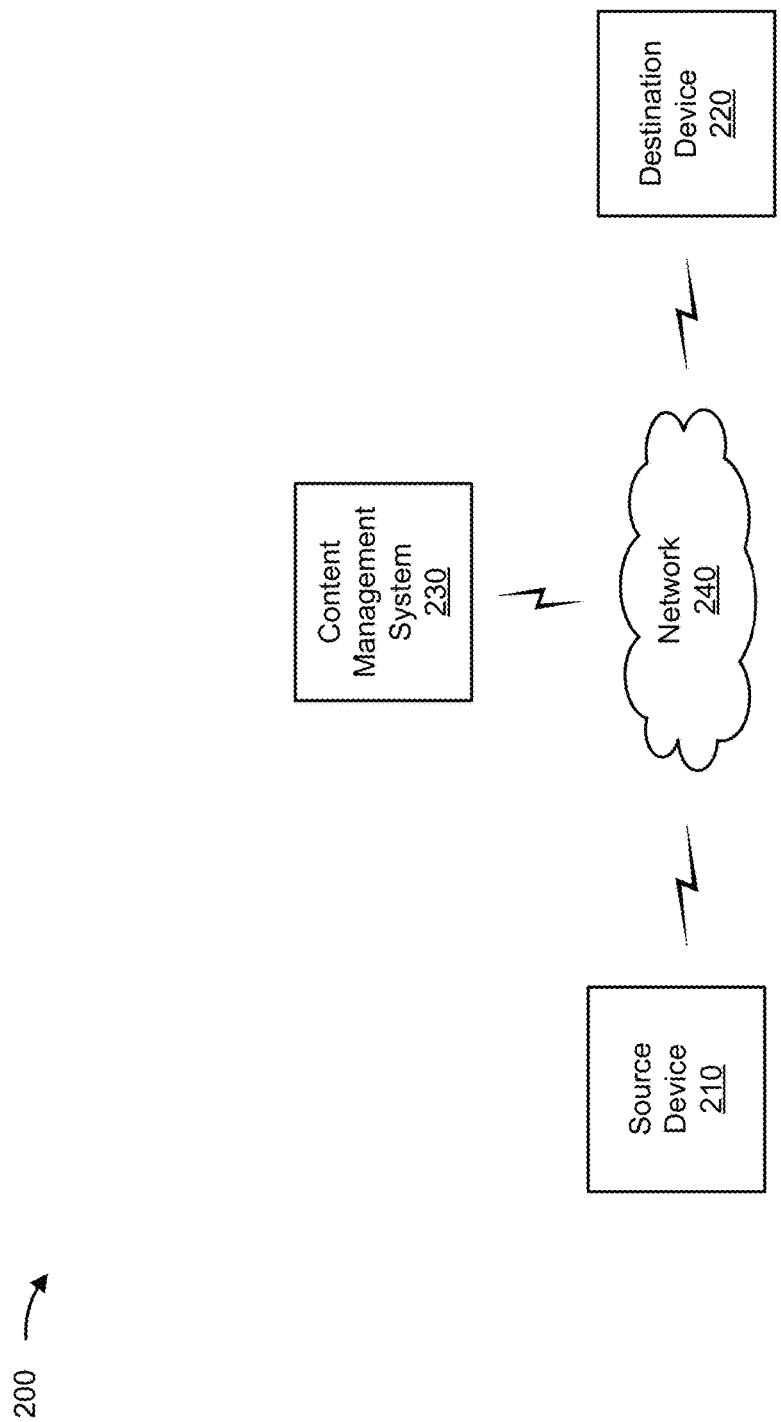
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a source device 210, a destination device 220, a content management system 230, and a network 240. Devices of environment 200 may interconnect via wired connections, wireless connections, or a combination of wired and wireless connections.

The source device 210 includes one or more devices capable of receiving, generating, storing, processing, and/or providing video data and/or positioning information associated with the source device 210, as described elsewhere herein. The source device 210 may include a communication device and/or a computing device. For example, the source device 210 may include a smartphone, an augmented reality headset, a set of augmented reality glasses, wireless communication device, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), among other examples. The source device 210 may communicate with one or more other devices of environment 200 (e.g., via network 240), as described elsewhere herein.

The destination device 220 includes one or more devices capable of receiving, generating, storing, processing, and/or providing video data and/or masking content, as described elsewhere herein. The destination device 220 may include a communication device and/or a computing device. For example, the destination device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The content management system 230 may be implemented on one or more server devices. The one or more server devices include one or more devices capable of receiving, generating, storing, processing, providing, and/or routing information associated with video data and/or obfuscating areas of a physical environment in the video data, as described elsewhere herein. The one or more server devices may include a communication device and/or a computing device. For example, the one or more server devices may include a server, such as an application server, a client server, a web server, a database server, a host server, a proxy server, a virtual server (e.g., executing on computing hardware), or a server in a cloud computing system. In some implementations, the one or more server devices include computing hardware used in a cloud computing environment.

The network 240 includes one or more wired and/or wireless networks. For example, the network 240 may include a cellular network, a public land mobile network, a local area network, a wide area network, a metropolitan area network, a telephone network, a private network, the Internet, and/or a combination of these or other types of networks. The network 240 enables communication among the devices of environment 200. In some implementations, the network 240 may be multiple networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
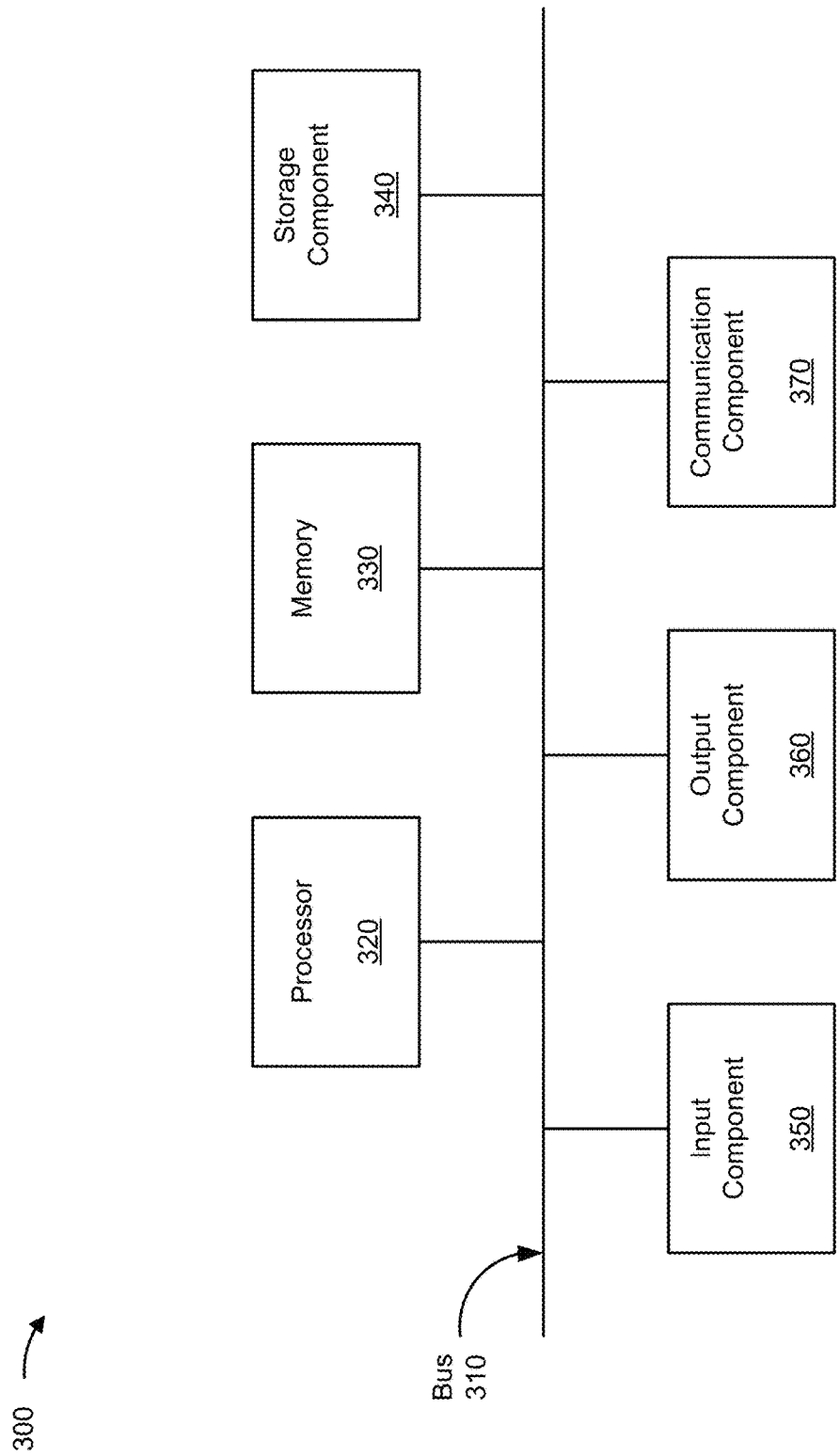
FIG. 3 is a diagram of example components of one or more devices of FIG. 2.

FIG. 3 is a diagram of example components of a device 300, which may correspond to a source device (e.g., source device 210), a destination device (e.g., destination device 220), and/or a content management system (e.g., content management system 230). In some implementations, the source device, the destination device, and/or the content management system may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
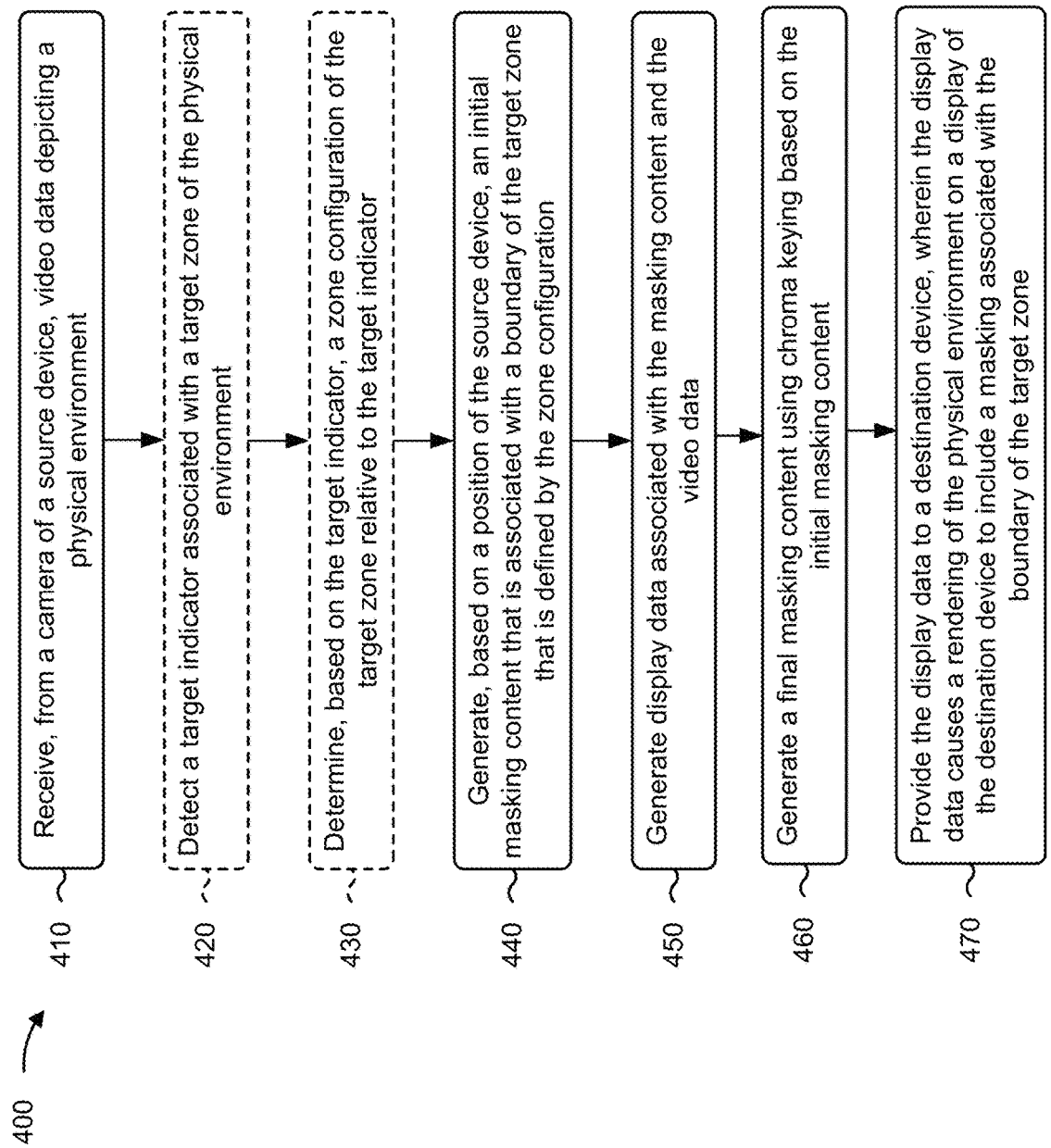
FIG. 4 is a flowchart of an example process associated with obfuscating of confidential areas of a physical environment depicted in a video.

FIG. 4 is a flowchart of an example process 400 associated with obfuscating of confidential areas of a physical environment depicted in a video. In some implementations, one or more process blocks of FIG. 4 may be performed by a content management system (e.g., content management system 230). In some implementations, one or more process blocks of FIG. 4 may be performed by another device or a group of devices separate from or including the content management system, such as a source device (e.g., source device 210), and/or a destination device (e.g., destination device 220). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a camera of a source device, video data depicting a physical environment (block 410). For example, the content management system may receive, from a camera of a source device, video data depicting a physical environment, as described above.

As further shown in FIG. 4, process 400 may include detecting a target indicator associated with a target zone of the physical environment (block 420). For example, the content management system may detect, within the video data, a target indicator associated with a target zone of the physical environment, as described above.

As further shown in FIG. 4, process 400 may include determining, based on the target indicator, a zone configuration of the target zone relative to the target indicator (block 430). For example, the content management system may determine, based on the target indicator, a zone configuration of the target zone relative to the target indicator, as described above.

As further shown in FIG. 4, process 400 may include generating, based on a position of the source device, an initial masking content that is associated with a boundary of the target zone that is defined by the zone configuration using a spatial mapping model based on the video data and the target indicator (block 440). For example, the content management system may generate, based on a position of the source device, an initial masking content that is associated with a boundary of the target zone that is defined by the zone configuration using a spatial mapping model based on the video data and the target indicator, as described above.

As further shown in FIG. 4, process 400 may include generating display data associated with the masking content and the video data (block 450). For example, the content management system may generate display data associated with the masking content and the video data, as described above.

As further shown in FIG. 4, process 400 may include providing the display data to a destination device, wherein the display data causes a rendering of the physical environment on a display of the destination device to include a masking associated with the boundary of the target zone (block 460). For example, the content management system may provide the display data to a destination device, wherein the display data causes a rendering of the physical environment on a display of the destination device to include a masking of the boundary of the target zone, as described above. In some implementations, the display data causes a rendering of the physical environment on a display of the destination device to include a masking of the boundary of the target zone.

Process 400 may include additional implementations, such as any single implementation or any combination of implementations described below and/or in connection with one or more other processes described elsewhere herein.

In a first implementation, process 400 includes prior to detecting the target indicator, processing the video data according to an image processing model, wherein the image processing model is configured to detect a plurality of target indicators, each target indicator associated with a respective target zone of the physical environment.

In a second implementation, the target indicator comprises a barcode, and wherein determining the zone configuration of the target zone comprises decoding the barcode to obtain the zone configuration of the target zone.

In a third implementation, process 400 includes, prior to generating the masking content, determining, based on a spatial locator of the source device, that the position of the source device is within the target zone, and generating the masking content as opaque content, wherein the masking obfuscates a portion of the physical environment that is outside of the target zone.

In a fourth implementation, process 400 includes, prior to generating the masking content, determining that the position of the source device is outside of the target zone, generating the masking content to be translucent, wherein the masking partially depicts a portion of the physical environment that is within the target zone, and obfuscating the video data that depicts a portion of the physical environment that is outside of the target zone.

In a fifth implementation, process 400 includes, prior to generating the masking content, determining the position of the source device relative to the target zone, and selecting, based on the position of the source device, a color of the masking content, wherein the masking content is generated based on the color.

In a sixth implementation, the video data is associated with a video stream that is being streamed from the source device to the destination device.

In a seventh implementation, the initial masking content comprises a translucent virtual container, and the final masking content comprises an opaque virtual container.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A method, comprising:
receiving, by a device and from a camera of a source device, video data depicting a physical environment;
detecting, by the device, a target indicator associated with a target zone of the physical environment;
determining, by the device and based on the target indicator, a zone configuration of the target zone relative to the target indicator;
generating, by the device and based on a position of the source device, an initial masking content that is associated with a boundary of the target zone that is defined by the zone configuration using a spatial mapping model based on the video data and the target indicator;
generating, by the device, a final masking content using chroma keying based on the initial masking content;
generating, by the device, display data associated with the final masking content and the video data; and
providing, by the device, the display data to a destination device,
wherein the display data causes a rendering of the physical environment on a display of the destination device to include a masking associated with the boundary of the target zone.

2. The method of claim 1, further comprising:
prior to detecting the target indicator, processing the video data according to an image processing model,
wherein the image processing model is configured to detect a plurality of target indicators, each target indicator of the plurality of target indicators being associated with a respective target zone of the physical environment.

3. The method of claim 1, wherein the target indicator comprises a barcode, and
wherein determining the zone configuration of the target zone comprises:
decoding the barcode to obtain the zone configuration of the target zone.

4. The method of claim 1, further comprising:
prior to generating the masking content, determining, based on a spatial locator of the source device, that the position of the source device is within the target zone; and
generating the masking content as opaque content,
wherein the masking obfuscates a portion of the physical environment that is outside of the target zone.

5. The method of claim 1, further comprising:
prior to generating the masking content, determining that the position of the source device is outside of the target zone;
generating the masking content to be translucent,
wherein the masking partially depicts a portion of the physical environment that is within the target zone; and
obfuscating the video data that depicts a portion of the physical environment that is outside of the target zone.

6. The method of claim 1, further comprising:
prior to generating the masking content, determining the position of the source device relative to the target zone; and
selecting, based on the position of the source device, a color of the masking content,
wherein the masking content is generated based on the color.

7. The method of claim 1, wherein the video data is associated with a video stream that is being streamed from the source device to the destination device.

8. The method of claim 1, wherein the initial masking content comprises a translucent virtual container, and the final masking content comprises an opaque virtual container.

9. A device, comprising:
one or more memories; and
one or more processors, communicatively coupled to the one or more memories, configured to:
receive, from a source device, video data depicting a physical environment;
process, using an image processing model, the video data to detect a target indicator depicted within the physical environment;
determine, based on the target indicator, a zone configuration of a target zone;
determine, based on a position of the source device relative to the target zone, masking content that is associated with a boundary of the target zone that is defined by the zone configuration,
wherein a level of transparency of the masking content is determined based on whether the position of the source device is within the target zone or outside of the target zone;
combine the masking content and the video data to generate display data; and
provide the display data to a destination device to cause a rendering of the physical environment on a display of the destination device to obfuscate a portion of the physical environment.

10. The device of claim 9, wherein the image processing model is configured to detect a plurality of target indicators, each target indicator of the plurality of target indicators being associated with a respective target zone of the physical environment.

11. The device of claim 9, wherein the target indicator identifies the zone configuration of the target zone based on spatial coordinates of the boundary of the target zone.

12. The device of claim 9, wherein the zone configuration of the target zone is associated with least one of:
a position of the target zone relative to the target indicator;
dimensions of the target zone relative to the target indicator;
dimensions of the target zone relative to the position of the target zone;
a shape of the target zone relative to the target indicator; or
a shape of the target zone relative to the position of the target zone.

13. The device of claim 9, wherein the target indicator comprises a particular type of object that is detectable within the physical environment by an image processing model that is configured to analyze the video data to detect that particular type of object.

14. The device of claim 9, wherein the one or more processors are further configured to:
prior to generating the masking content, obtain spatial location information that identifies the position of the source device relative to the target zone,
wherein the masking content is generated based on obtaining the spatial location information.

15. The device of claim 9, wherein the target indicator comprises a quick response (QR) code and/or a parallel line code.

16. A non-transitory computer-readable medium storing a set of instructions, the set of instructions comprising:

one or more instructions that, when executed by one or more processors of a device, cause the device to:
monitor at least one stream of video data from a source device,
wherein the video data depicts a physical environment;
determine, based on the at least one stream of video data, a zone configuration of a target zone of the physical environment;
generate, based on a position of the source device and the zone configuration, masking content to depict a boundary of the target zone,
wherein a level of transparency of the masking content is determined based on whether the position of the source device is within the target zone or outside of the target zone;
generate, based on the masking content and the video data, display data that is configured to obfuscate a portion of the physical environment according to the boundary of the target zone being depicted by the masking content; and
provide the display data to a destination device to cause a rendering of the physical environment, according to the display data, to include a masking associated with the physical environment.

17. The non-transitory computer-readable medium of claim 16, wherein the at least one stream of video data comprises:
a first video stream depicting a captured scene associated with the physical environment; and
a second video stream depicting the captured scene and a representation of the target zone.

18. The non-transitory computer-readable medium of claim 16, wherein the target zone is associated with a target indicator, the target indicator comprising at least one of:
a barcode that is decoded to determine zone configuration, or
a particular object that is mapped to the zone configuration.

19. The non-transitory computer-readable medium of claim 18, wherein the target indicator is positioned within the target zone in association with an object within the target zone that is rendered via the display data.

20. The non-transitory computer-readable medium of claim 16, wherein the one or more instructions further cause the device to:
determine, based on a spatial locator of the source device, that the position of the source device is within the target zone; and
generate the masking content as opaque content,
wherein the masking obfuscates a portion of the physical environment that is outside of the target zone.

21. The non-transitory computer-readable medium of claim 16, wherein the one or more instructions further cause the device to:
determine that the position of the source device is outside of the target zone;
generate the masking content to be translucent,
wherein the masking corresponds to an overlay that partially depicts a portion of the physical environment that is within the target zone; and
generate the display data to obfuscate the video data that depicts a portion of the physical environment that is outside of the target zone.

* * * * *